(12) United States Patent
Kunimi et al.

(10) Patent No.: US 6,982,705 B2
(45) Date of Patent: Jan. 3, 2006

(54) IMAGING APPARATUS AND METHOD OF OPTICAL-BLACK CLAMPING

(75) Inventors: Hiroyasu Kunimi, Kamakura (JP); Hiroshi Nishiyama, Kanagawa-Ken (JP); Tetsuya Oura, Yokohama (JP); Hiroyuki Miyahara, Yokohama (JP); Takeshi Ibaraki, Kawasaki (JP)

(73) Assignee: Victor Company of Japan, Ltd., Yokohama (JP)

( * ) Notice: Subject to any disclaimer, the term of this patent is extended or adjusted under 35 U.S.C. 154(b) by 469 days.

(21) Appl. No.: 10/373,864

(22) Filed: Feb. 27, 2003

(65) Prior Publication Data

US 2003/0160772 A1 Aug. 28, 2003

(30) Foreign Application Priority Data

Feb. 27, 2002 (JP) .............................. 2002-050580

(51) Int. Cl.
G09G 5/00 (2006.01)

(52) U.S. Cl. ....................................... 345/204; 348/294
(58) Field of Classification Search ................ 345/204, 345/679; 348/230.1, 252, 294–302, 311–324; 348/ 382/103, 106, 190, 199, 312
See application file for complete search history.

(56) References Cited

U.S. PATENT DOCUMENTS 5,293,225 A * 3/1994 Nishiyama et al.
6,850,275 B1 * 2/2005 Minakami ................... 348/252
2002/0047934 A1 * 4/2002 Nitta et al.
2002/0140830 A1 * 10/2002 Shirakawa et al.

* cited by examiner

Primary Examiner—Regina Liang
(74) Attorney, Agent, or Firm—Jacobson Holman PLLC (57) ABSTRACT

An imaging apparatus has a solid-state image sensing device having an imaging area divided into left and right sub-imaging areas, a first optical-black (OB) area and a second OB area being provided at both edges of the imaging area in the horizontal direction. First video signals are extracted from monitoring areas in the sub-imaging areas close to the border between the sub-imaging areas. Optical-black clamping is applied to second video signals output from the sub-imaging areas by subtracting a first OB signal indicating an OB level in the first OB area from the second video signal output from one of the sub-imaging area and subtracting a second OB signal indicating an OB level in the second OB area from the second video signal output from the other of the sub-imaging areas. Detected first in the optical-black clamping is a level difference between the extracted first video signals. Calculated next is an adjusting value per row of pixels, that provides the smallest level difference per row of pixels in the imaging area based on the detected level difference. The first OB signal is subtracted from one of the second video signals and the second OB signal is subtracted from the other second video signal, thus outputting an optical-black-clamped video signal. Video-signal levels are adjusted by multiplying the optical-black-clamped video signal by the adjusting value.

8 Claims, 8 Drawing Sheets

IMAGING APPARATUS AND METHOD OF OPTICAL-BLACK CLAMPING

BACKGROUND OF THE INVENTION

The present invention relates to an imaging apparatus equipped with a solid-state image sensing device having an imaging area divided into at least two areas from which video signals are derived, and a method of optical-black clamping.

With widespread home use of camera-built-in VTRs, gradually spread is a camera-built-in VTR with an electronic still-picture imaging function to process video signals output from a solid-state image sensing device and transfer the processed signals (still-picture data) to several types of equipment, such as personal computers.

The total number of pixels in a solid-state image sensing device has been dramatically increased with development of LSI microfabrication technology.

Most camera-built-in VTRs have an OB (Optical Black)-clamp function.

The OB-clamp function adjusts a black level of a video signal output from a solid-state image sensing device. The clamp function requires rows of several ten black-level detecting pixels in the vertical direction in an imaging area of the image sensing device.

Several pixel signals are extracted from among those black-level detecting pixels. The average level of these pixel signals is set in a signal level of no light output. The set signal level is subtracted from an output signal level from the imaging area to adjust a black level of a video signal.

The number of pixels in each row increases as the number of those on a solid-state image sensing device increases. The clock frequency for signal output from the image sensing device becomes higher in proportion to the increase of pixels. This is because the duration of video-signal output from a solid-state image sensing device per row of pixels depends on video standard such as NTSC and PAL.

Signal output from a solid-state image sensing device at high clock frequency requires the same high frequency for post processing. Such a requirement causes many restrictions on circuit design with noise and radiation suppression.

The clock frequency can be made half by providing a solid-state image sensing device with two signal-output channels for an imaging area divided in left and right.

Such imaging-area division, however, increases the number of signal-output channels for imaging apparatus used in camera-built-in VTRs. Increase in the number of signal-output channels further causes variation in output-buffer characteristics over the channels. This results in stepped signal fluctuation on the border of the output channels. The stepped signal fluctuation will become sharp as the output fluctuates over the output-channel buffers due to temperature rise, which could occur in long-period filming.

Imaging apparatus used in camera-built-in VTRs with right and left imaging areas suffer OB level differences for video signals output from the imaging areas. The main cause of the OB-level difference is variation in imaging characteristics occurring in mass production of solid-state image sensing devices. The OB-level difference causes inaccurate OB-clamp function due to usage of the average of different OB levels. This results in difference in black level between right and left in video.

Moreover, imaging apparatus with multiple pixels require a high frequency such as 36 MHz for drive pulses in charge transfer. Such a high frequency causes unrectangular pulse waveforms and inefficient charge transfer through many transfer stages. This results in OB-level differences over rows of pixels, which should not occur ideally.

Furthermore, a reference black level is set at an average output-signal level from black-level detection pixels over the entire imaging areas in known imaging apparatus. This reference black-level setting could cause inaccurate black-level adjustments due to level difference between the upper and lower zones in imaging areas.

Known imaging apparatus further suffer small modulated light outputs through several color filters even at no light input. Such small outputs do not meet a reference black level set at the average of chrominance signals.

SUMMARY OF THE INVENTION

A purpose of the present invention is to provide an imaging apparatus with a solid-state image sensing device and a method of optical-black clamping that achieve accurate cancellation of stepped outputs between right and left in device imaging area divided into two or more.

Another purpose of the present invention is to provide an imaging apparatus with an enhanced OB-clamp function.

Still another purpose of the present invention is to provide an imaging apparatus with a further enhanced OB-clamp function accurate between right and left in the imaging area divided into two or more on a solid-state image sensing device.

The present invention provides an imaging apparatus comprising: a solid-state image sensing device having an imaging area divided into at least two sub-imaging areas in a horizontal direction in the imaging area, a first optical-black area and a second optical-black area being provided at both edges of the imaging area in the horizontal direction; an extractor to extract first video signals from a plurality of monitoring areas provided in the sub-imaging areas in the vicinity of the border between the sub-imaging areas; and an optical-black clamp processor to apply optical-black clamp processing to second video signals output from the sub-imaging areas by subtracting a first optical-black signal indicating an optical black level in the first optical-black area from the second video signal output from one of the sub-imaging areas and subtracting a second optical-black signal indicating an optical black level in the second optical-black area from the second video signal output from the other of the sub-imaging areas, the optical-black clamp processor including: a detector to detect a level difference between the extracted first video signals; a calculator to calculate an adjusting value per row of pixels, that provides the smallest level difference per row of pixels in a vertical direction in the imaging area based on the detected level difference; a plurality of optical-black clampers each subtracting the first optical-black signal from the second video signal output from one of the sub-imaging areas and subtracting the second optical-black signal from the second video signal output from the other of the sub-imaging areas, thus outputting an optical-black-clamped video signal; and an adjuster to perform adjustments to video-signal levels by multiplying the optical-black-clamped video signal by the adjusting value.

Moreover, the present invention provides an imaging apparatus comprising: a solid-state image sensing device having an imaging area divided into at least a first sub-imaging area and a second sub-imaging area in a horizontal direction in the imaging area, a first optical-black area and a second optical-black area being provided at both edges of the imaging area in the horizontal direction; and an optical-black clamp processor to apply optical-black clamp processing to first video signals output from the sub-imaging areas by subtracting a first optical-black signal indicating an optical black level in the first optical-black area from one of the first video signals output from the sub-imaging area and subtracting a second optical-black signal indicating an optical black level in the second optical-black area from the other of the first video signals output from the sub-imaging areas, the optical-black clamp processor including: a first optical-black adjusting-level calculator to calculate a first optical-black adjusting level per row of pixels in a vertical direction in the first optical-black area; a second optical-black adjusting-level calculator to calculate a second optical-black adjusting level per row of pixels in the second optical-black area; a first adjuster to subtract the first optical-black adjusting level per row of pixels from a second video signal per row of pixels in the first sub-imaging area close to the first optical-black area; and a second adjuster to subtract the second optical-black adjusting level per row of pixels from a third video signal per row of pixels in the second sub-imaging area close to the second optical-black area.

Furthermore, the present invention provides a method of optical-black clamping for an imaging apparatus having a solid-state image sensing device having an imaging area divided into at least two sub-imaging areas in a horizontal direction in the imaging area, a first optical-black area and a second optical-black area being provided at both edges of the imaging area in the horizontal direction, the method comprising the steps of: extracting first video signals from a plurality of monitoring areas provided in the sub-imaging areas in the vicinity of the border between the sub-imaging areas; and applying optical-black clamp processing to second video signals output from the sub-imaging areas by subtracting a first optical-black signal indicating an optical black level in the first optical-black area from the second video signal output from one of the sub-imaging areas and subtracting a second optical-black signal indicating an optical black level in the second optical-black area from the second video signal output from the other of the sub-imaging areas, the applying step including: detecting a level difference between the extracted first video signals; calculating an adjusting value per row of pixels, that provides the smallest level difference per row of pixels in a vertical direction in the imaging area based on the detected level difference; subtracting the first optical-black signal from one of the second video signals output from the one of the sub-imaging areas and subtracting the second optical-black signal from the second video signal output from the other of the sub-imaging areas, thus outputting an optical-black-clamped video signal; and performing adjustments to video-signal levels by multiplying the optical-black-clamped video signal by the adjusting value.

Still furthermore, the present invention provides a method of optical-black clamping for an imaging apparatus having a solid-state image sensing device having an imaging area divided into at least a first sub-imaging area and a second sub-imaging area in a horizontal direction in the imaging area, a first optical-black area and a second optical-black area being provided at both edges of the imaging area in the horizontal direction, the method comprising the steps of: applying optical-black clamp processing to first video signals output from the sub-imaging areas by subtracting a first optical-black signal indicating an optical black level in the first optical-black area from the first video signal output from one of the sub-imaging areas and subtracting a second optical-black signal indicating an optical black level in the second optical-black area from the first video signal output from the other of the sub-imaging areas, the applying step including: calculating a first optical-black adjusting level per row of pixels in a vertical direction in the first optical-black area; calculating a second optical-black adjusting level per row of pixels in the second optical-black area; subtracting the first optical-black adjusting level per row of pixels from a second video signal per row of pixels in the first sub-imaging area close to the first optical-black area; and subtracting the second optical-black adjusting level per row of pixels from a third video signal per row of pixels in the second sub-imaging area close to the second optical-black area.

DESCRIPTION OF THE PREFERRED EMBODIMENT

An embodiment of and modifications to imaging apparatus according to the present invention will be disclosed in detail with reference to the attached drawings.

Figure 1:
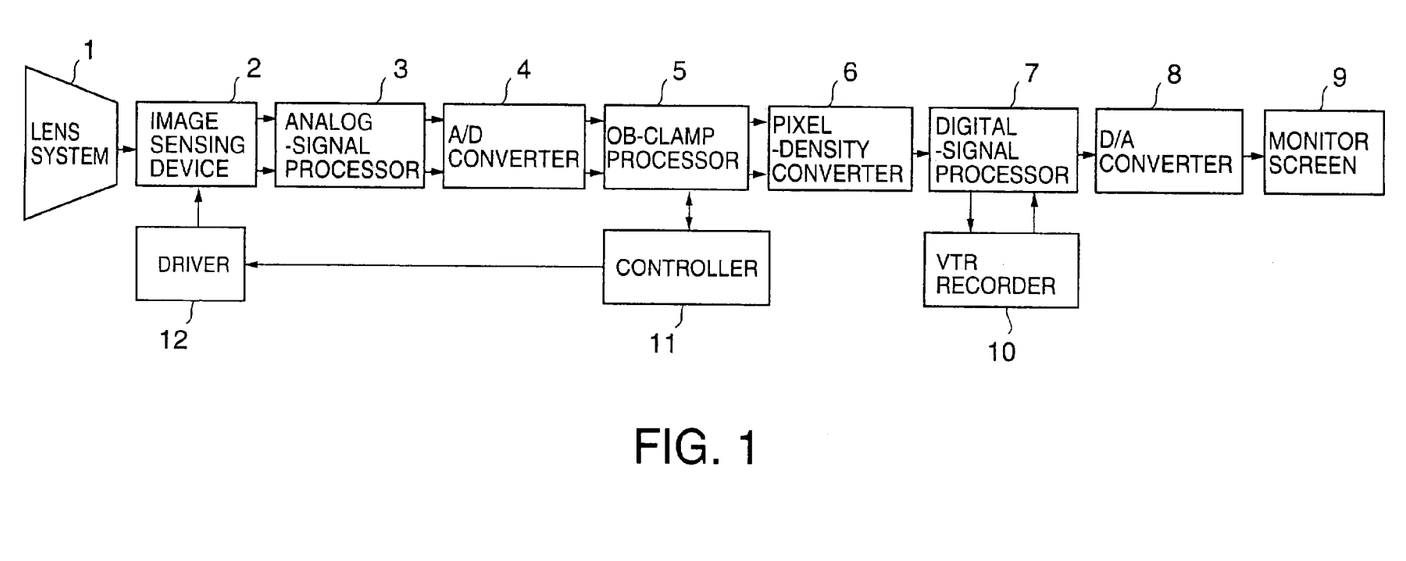
FIG. 1 is a block diagram of an embodiment of imaging apparatus according to the present invention.

FIG. 1 is a block diagram of an embodiment of the imaging apparatus used in a camera-built-in VTR.

Incident light from a target to be imaged and converged through an optical lens system 1 is radiated onto a solid-state image sensing device 2 for photoelectric transfer.

Figure 2:
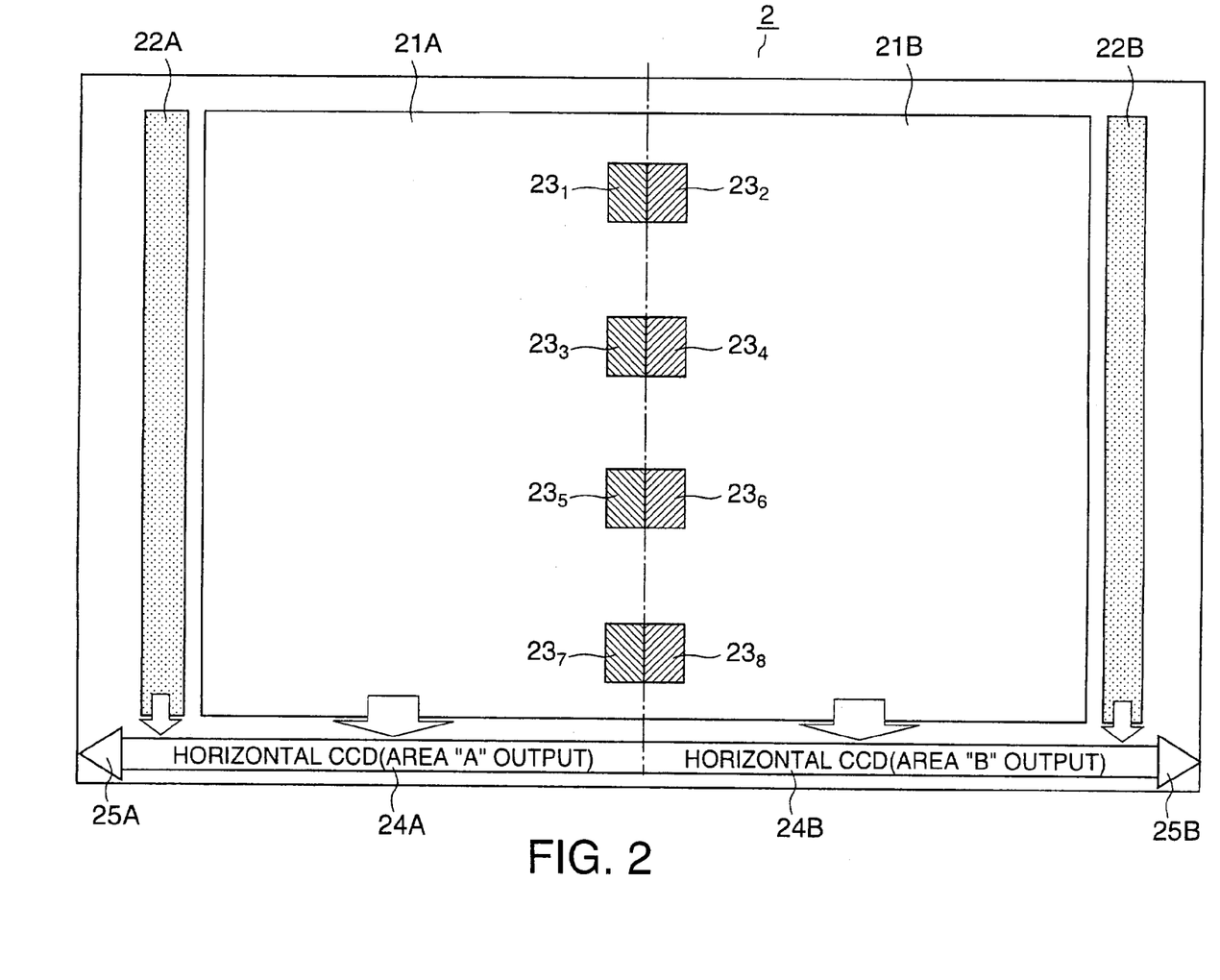
FIG. 2 is an illustration of a solid-state image sensing device in the imaging apparatus shown in FIG. 1.

Illustrated in FIG. 2 is image-area arrangement on the solid-state image sensing device 2.

The imaging area on the solid-state image sensing device 2 consists of two imaging areas 21A and 21B in left and right, and OB areas 22A and 22B for optical-black-level detection provided on both sides of the imaging areas 21A and 21B.

The image sensing device 2 is equipped with a horizontal CCD (Charge-Coupled Device) 24A for horizontal transfer of charges transferred from pixels of the imaging area 21A and the OB area 22A through a vertical transfer path (not shown); a horizontal CCD 24B for horizontal transfer of charges transferred from pixels of the imaging area 21B and the OB area 22B through a vertical transfer path (not shown); and output amplifiers 25A and 25B for amplifying output video signals from the CCDs 24A and 24B.

The amplifiers 25A and 25B output video signals from the left and right imaging areas 21A and 21B, respectively, per row of pixels.

The solid-state image sensing device 2 with the two signal output channels (horizontal CCDs 24A and 24B) operates at horizontal-transfer clock frequency ½ that of known solid-state image sensing devices. The image sensing device 2 thus allows high-quality videos to be stored on storage media through an imaging apparatus similar to known apparatus.

In FIG. 1, left and right two-channel video signals output from the amplifiers 25A and 25B (FIG. 2) are supplied to an analog-signal processor 3 for correlated double sampling, automatic gain control (AGC), etc., under control by a drive signal from a driver 12.

The processed video signals are supplied to an A/D converter 4 for analog-to-digital conversion.

The digital two-channel video signals are supplied to an OB-clamp processor 5 for OB-clamp processing and gain adjustments to the amplifiers 25A and 25B (FIG. 2) which will be disclosed later, under control by a control signal from a controller 11.

The two-channel video signals are supplied to a pixel-density converter 6 from the OB-clamp processor 5, for pixel-density conversion (pixel decimation per unit of time, etc.), thus converted into a one-channel video signal.

The one-channel video signal output from the pixel-density converter 6 is supplied to a digital-signal processor 7 for several types of signal processing and standard TV-signal format conversion.

The one-channel video signal converted into a standard TV-signal format data is supplied to a D/A converter 8 for digital-to-analog conversion.

The one-channel video signal converted into an analog video signal is then displayed on a monitor screen 9.

Moreover, a video signal output from the digital-signal processor 7 is supplied to a VTR recorder 10 and recorded on a magnetic tape through rotary heads.

Disclosed below in detail are output gain adjustments to the left and right amplifiers 25A and 25B (FIG. 2) of the solid-state image sensing device 2.

The amplifiers 25A and 25B are designed to have the same gain, however, exhibit different gain characteristics due to mass production, which cause stepped output on the border between right- and left-channel video signals.

Figure 3:
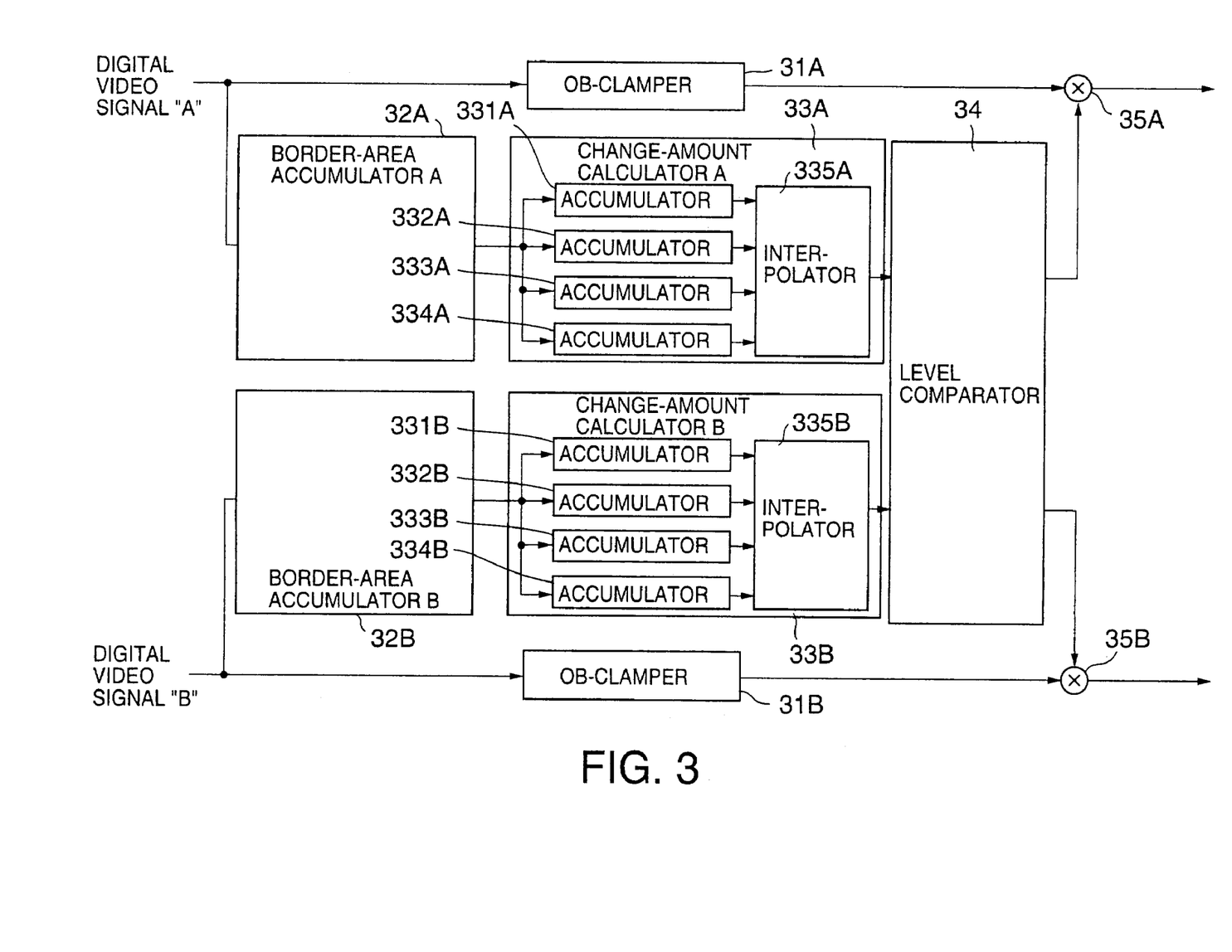
FIG. 3 is a block diagram of an OB-clamp processor in the imaging apparatus shown in FIG. 1.

FIG. 3 shows a block diagram of the OB-clamp processor 5 to avoid such a problem.

A video signal taken from the imaging area 21A (FIG. 2) is converted into a digital video signal "A" by the A/D converter 4 and supplied to an OB-clamper 31A. Video signal components from several pixels on the OB area 22A are extracted and averaged. The average level is set to a signal level of no light input and subtracted from the video signal taken from the imaging area 21A under the known clamping processing. The video signal "A" taken from the imaging area 21A is also supplied to a border-area accumulator 32A.

A video signal taken from the imaging area 21B (FIG. 2) is also converted into a digital video signal "B" by the A/D converter 4 and supplied to an OB-clamper 31B. The digital video signal is subjected to the known clamping processing the same as the OB-clamper 31a, based on a signal from the OB area 22B. The processed signal is supplied to a border-area accumulator 32B.

The border-area accumulators 32A and 32B each extracts signal components from several pixels, such as 8 pixels, in the vicinity of the border between the imaging areas 21A and 21B and calculates the average of the extracted signal components.

The output of the border-area accumulator 32A is supplied to a change-amount calculator 33A for accumulating signal components from pixels in monitoring areas $23_1$, $23_3$, $23_5$ and $23_7$ separately. The monitoring areas $23_1$, $23_3$, $23_5$ and $23_7$ are located in the imaging area 21A but close to the imaging area 21B, as shown in FIG. 2.

The output of the border-area accumulator 32B is supplied to a change-amount calculator 33B for accumulating signal components from pixels in monitoring areas $23_2$, $23_4$, $23_6$ and $23_8$ separately.

The monitoring areas $23_2$, $23_4$, $23_6$ and $23_8$ are located in the imaging area 21B but close to the imaging area 21A, as shown in FIG. 2.

The monitoring areas $23_1$, $23_3$, $23_5$ and $23_7$ are located in the vicinity of the monitoring areas $23_2$, $23_4$, $23_6$ and $23_8$, respectively.

Figure 4:
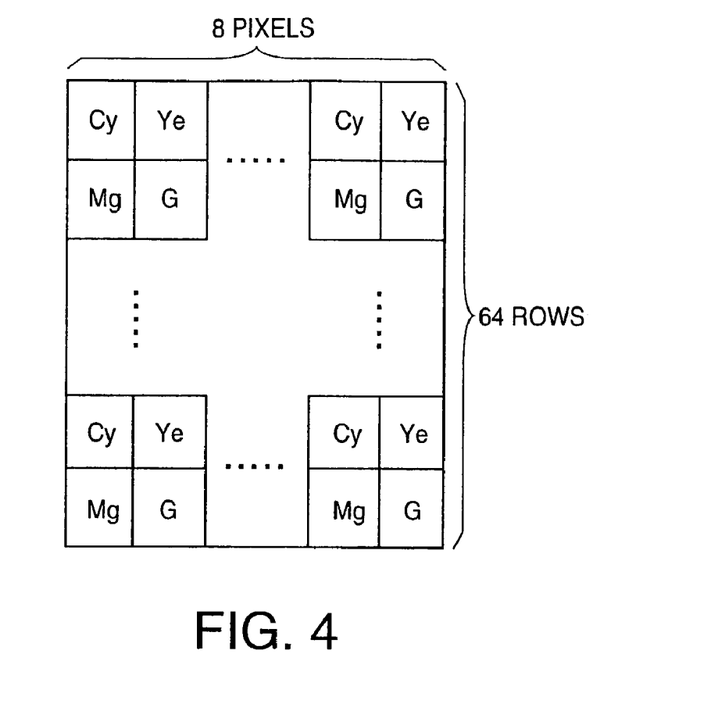
FIG. 4 is an illustration of each monitoring area shown in FIG. 2.

Each monitoring area covers, for example, 8 pixels in each of 64 rows, as shown in FIG. 4. Four pixels provided with cyan (Cy) color filters and other four pixels provided with yellow (Ye) color filters are alternatively aligned in 8 pixels in total on each odd row. Moreover, four pixels provided with magenta (Mg) color filters and other four pixels provided with green (G) color filters are alternatively aligned in 8 pixels in total on each even row. In other words, each monitoring area covers 128 pixels for each color filter or 512 pixels in total in FIG. 4.

The locations of the monitoring areas $23_1$, $23_3$, $23_5$ and $23_7$ in the imaging area 21A and also the locations of the monitoring areas $23_2$, $23_4$, $23_6$ and $23_8$ in the imaging area 21B can be shifted to any positions in each imaging area under control by the controller 11 (FIG. 1).

The change-amount calculator 33A (FIG. 3) accumulates the signal components from the pixels in the monitoring areas $23_1$, $23_3$, $23_5$ and $23_7$ separately.

In detail, the change-amount calculator 33A performs accumulation to the output of the border-area accumulator 32A for each of the monitoring areas $23_1$, $23_3$, $23_5$ and $23_7$ per 128 pixels of each of four color filters (not for 512 pixels at once) with four accumulators, as follows:

A first accumulator 331A calculates an accumulated value C1 for the 128 pixels of Cy-color filter, an accumulated value Y1 for the 128 pixels of Y-color filter, an accumulated value M1 for the 128 pixels of Mg-color filter and an accumulated value G1 for the 128 pixels of G-color filter, in the monitoring areas $23_1$.

A second accumulator 332A calculates an accumulated value C2 for the 128 pixels of Cy-color filter, an accumulated value Y2 for the 128 pixels of Y-color filter, an accumulated value M2 for the 128 pixels of Mg-color filter and an accumulated value G2 for the 128 pixels of G-color filter, in the monitoring areas $23_3$.

A third accumulator 333A calculates an accumulated value C3 for the 128 pixels of Cy-color filter, an accumulated value Y3 for the 128 pixels of Y-color filter, an accumulated value M3 for the 128 pixels of Mg-color filter and an accumulated value G3 for the 128 pixels of G-color filter, in the monitoring areas $23_5$.

A fourth accumulator 334A calculates an accumulated value C4 for the 128 pixels of Cy-color filter, an accumulated value Y4 for the 128 pixels of Y-color filter, an accumulated value M4 for the 128 pixels of Mg-color filter and an accumulated value G4 for the 128 pixels of G-color filter, in the monitoring areas $23_7$.

The same accumulation is performed by the change-amount calculator 33B (FIG. 3) to the output of the border-area accumulator 32B for each of the monitoring areas $23_2$, $23_4$, $23_6$ and $23_8$ per 128 pixels of each of four color filters (not for 512 pixels at once) with four accumulating sections.

The accumulation processing per 128 pixels cancels variation in modulation by the color filters for accurate detection of stepped outputs between imaging areas 21A and 21B.

The accumulated values (C1, Y1, M1 and G1), (C2, Y2, M2 and G2), (C3, Y3, M3 and G3) and (C4, Y4, M4 and G4) from the monitoring areas $23_1$, $23_3$, $23_5$ and $23_7$, respectively, are supplied to an interpolator 335AA (FIG. 3) of the change-amount calculator 33A.

Figure 5:
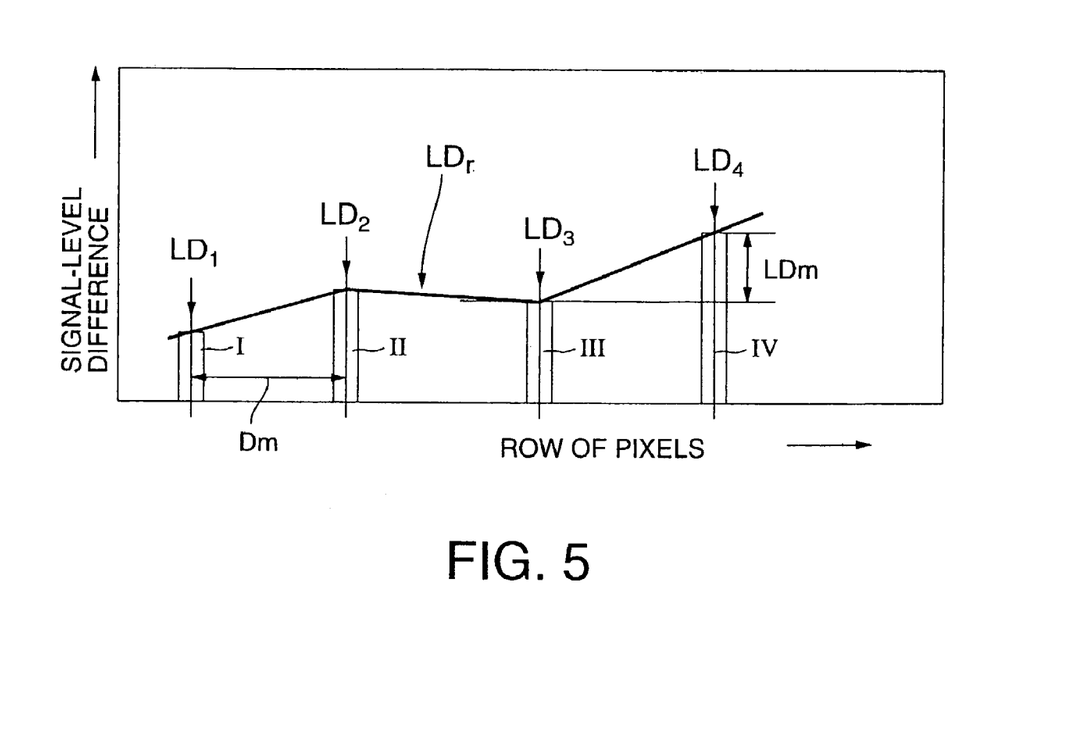
FIG. 5 is graph indicating signal-level difference per row of pixels calculated by the OB-clamp processor shown in FIG. 3.

The interpolator 335A calculates an adjustment value for each row of pixels, as shown in FIG. 5 from (C1, C2, C3 and C4) for the pixels of Cy-color filer. The same adjustment-value calculation is applied to (Y1, Y2, Y3 and Y4), (M1, M2, M3 and M4) and (G1, G2, G3 and G4) for the pixels of Y-, Mg- and G-color filers, respectively.

The accumulated values (C1, Y1, M1 and G1), (C2, Y2, M2 and G2), (C3, Y3, M3 and G3) and (C4, Y4, M4 and G4) from the monitoring areas $23_2$, $23_4$, $23_6$ and $23_8$, respectively, are supplied to an interpolator 335B (FIG. 3) of the change-amount calculator 33B, for the adjustment-value calculation the same as the interpolator 335A.

The adjustment-value calculation per row of pixels based on the accumulated values on the pixels of the same color filter is performed for each picture. The repeated calculation produces a constant signal level over several pictures while suppressing effects of spontaneous signal change and noises in each picture, for further accurate detection of stepped outputs between imaging areas 21A and 21B.

Adjustment values obtained by the interpolators 335A and 335B are supplied to a level comparator 34 (FIG. 3).

The level comparator 34 compares levels of the adjustment values for the same color filter on the same row of pixels between adjacent two monitoring areas among the 8 monitoring areas $23_1$ to $23_8$ (FIG. 2) to obtain stepped values from the level difference. The stepped values are subjected to linear interpolation to obtain level adjustment values.

The stepped values (signal-level differences), or the level differences between the adjustment values for the same color filter on the same row of pixels between adjacent two monitoring areas are indicated in FIG. 5.

In FIG. 5, the signs $LD_1$, $LD_2$, $LD_3$ and $LD_4$ indicate signal-level differences between the monitoring areas $23_1$ and $23_2$, $23_3$ and $23_4$, $23_5$ and $23_6$, and $23_7$ and $23_8$ (FIG. 2), respectively.

Moreover, in FIG. 5, the sign $LD_r$ indicates a signal-level difference per row of pixels, $LD_m$ a signal-level difference between the monitoring areas in the vertical direction, such as, between the height of III (the height indicating the signal-level difference between the areas $23_5$ and $23_6$) and the height of IV (the height indicating the signal-level difference between the areas $23_7$ and $23_8$), and $D_m$ a distance between the monitoring areas in the vertical direction, such as the areas $23_1$ and $23_3$.

The signs I, II, III and IV, in FIG. 5, indicate the range of row of pixels in each monitoring area. For example, the left, the center and the right vertical lines in the range I indicate the top, the middle and the last row of pixels, respectively, in the each of the monitoring areas $23_1$ and $23_2$.

The level comparator 34 applies linear interpolation to the stepped values I to IV for the respective rows of pixels. The interpolated stepped values are then stored in a buffer for respective row of pixels in the comparator 34.

The level-adjustment values that match a level ratio per row of pixels is obtained from the stored interpolated stepped values.

In detail, a level ratio is a/b when the outputs of the change-amount calculators 33A and 33B are "a" and "b", respectively. Thus, the level comparator 34 outputs a level-adjustment value b/a to a multiplier 35A (FIG. 3) for multiplying the output of the OB clamper 31A by the value b/a whereas a level-adjustment value 1 to a multiplier 35B (FIG. 3) for multiplying the output of the OB clamper 31B by the value 1.

The outputs of the multipliers 35A and 35B of the OB-clamp processor 5 (FIG. 1) are the two-channel video signals with no stepped components between the adjacent imaging areas 21A and 21B even through the output amplifiers 25A and 25B (FIG. 2) exhibiting different gain characteristics due to mass production.

Therefore, the first embodiment provided with the OB-clamp processor 5 (FIG. 3) achieves high yields and cost reduction in production of imaging apparatus equipped with solid-state image sensing devices.

Figure 6:
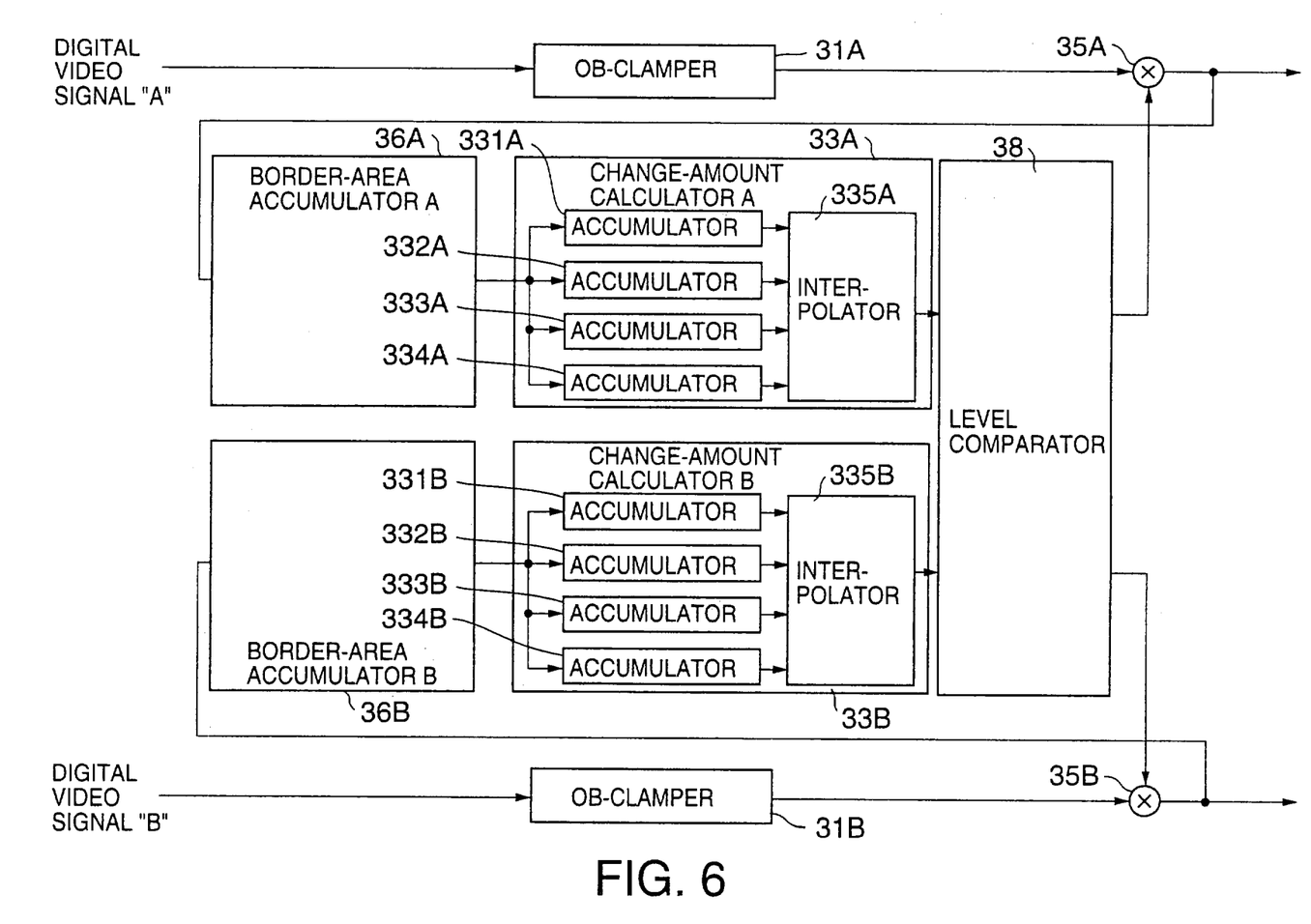
FIG. 6 is a block diagram of a modification to the OB-clamp processor shown in FIG. 3.

Disclosed next with reference to FIG. 6 is a modification to the OB-clamp processor 5. Elements in this modification that are the same or analogous to the elements shown in FIG. 3 are referenced by the same reference numerals and will not be explained.

The OB-clamp processor 5 (FIG. 3) and the modification (FIG. 6) are different from each other as follows:

The former processor (FIG. 3) obtains the signals to be accumulated by sampling the video signals before supplied to the OB clampers 31A and 31B.

On the other hand, the latter (FIG. 6) obtains the signals to be accumulated by sampling the video signals after level adjustments by the OB dampers 31A and 31B and also the multipliers 35A and 35B.

In FIG. 6, a video signal output from the multiplier 35A after level adjustments for the imaging area 21A (FIG. 2) is supplied to a border-area calculator 36A for the same processing as the counterpart 32A (FIG. 3).

Another video signal output from the multiplier 3BA after level adjustments for the imaging area 21B (FIG. 2) is supplied to a border-area calculator 36B for the same processing as the counterpart 32B (FIG. 3).

The outputs of the border-area calculators 36A and 36B are supplied to the change-amount calculators 33A and 33B, the level comparators 34 and the multipliers 35A and 35B under the same processing as explained with reference to FIGS. 3 to 5.

The modification shown in FIG. 6 has feed-back loops for level-difference adjustments for the video signal from the left and right imaging areas 21A and 21B. This feed-back loop circuitry performs level control to achieve no gain difference all time between the output amplifiers 25A and 25B (FIG. 2) of the solid-state image sensing device 2 (FIG. 1), as a self-management system.

Moreover, the border between the imaging areas 21A and 21B can be detected from the video signal and also horizontal and vertical synchronizing signals output from the digital-signal processor 7 for final stepped-component monitoring, thus achieving further accurate level-difference detection.

The difference between the OB-clamp processors in FIGS. 3 and 6 lies in signal-sampling timing for level-difference detection. Not only one, but several sampling timings in FIGS. 3 and 6 can be used for accurate level-difference detection.

Figure 7:
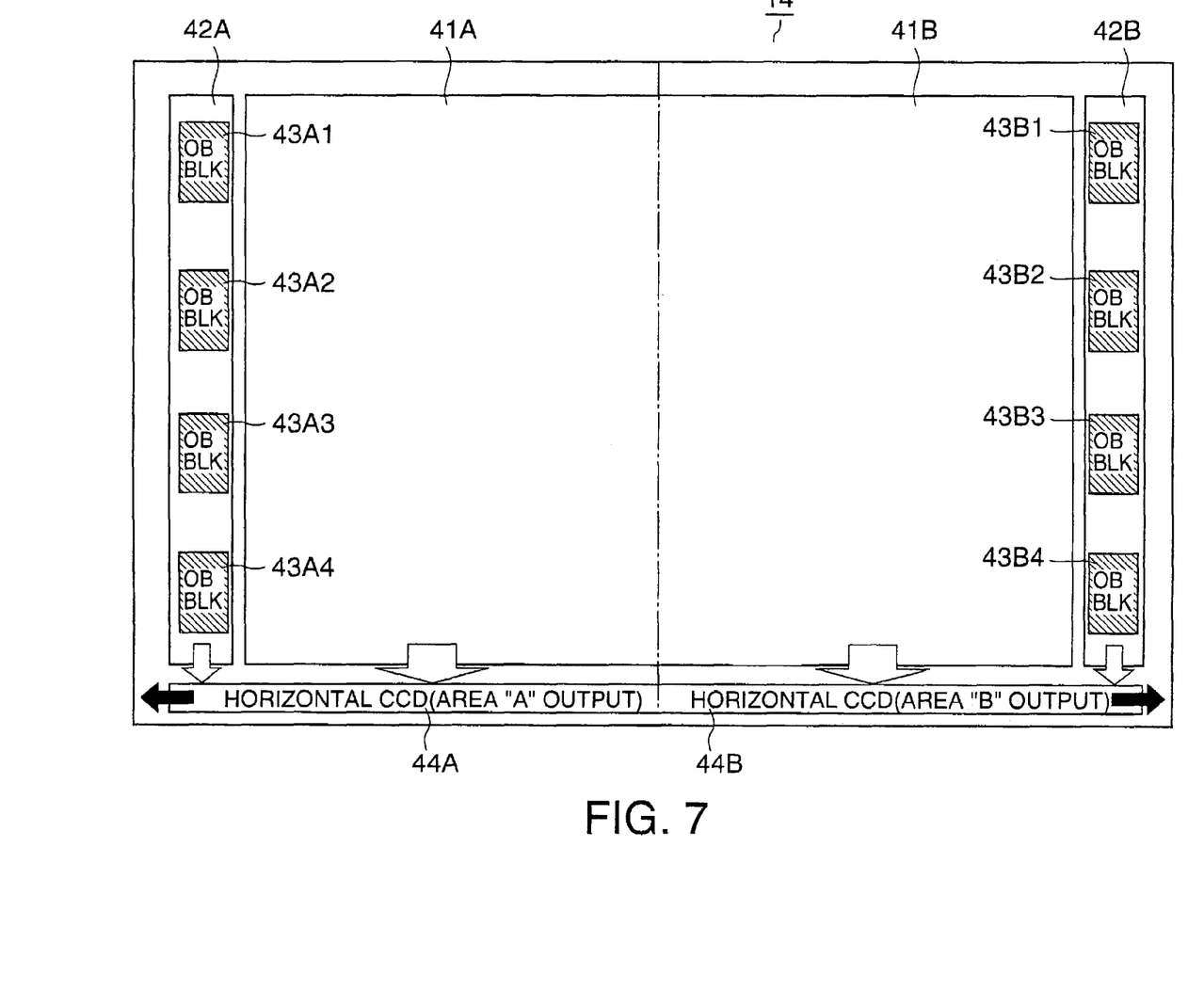
FIG. 7 is an illustration of a modification to the solid-state image sensing device shown in FIG. 2.

Disclosed next with reference to FIG. 7 is a modification to the solid-state image sensing device 2 shown in FIG. 2.

A solid-state image sensing device 14 in this modification consists of two imaging areas 41A and 41B in left and right, and OB areas 42A and 42B for optical-black-level detection provided on both sides of the imaging areas 41A and 41B.

The image sensing device 14 is equipped with a horizontal CCD 44A for horizontal transfer of charges transferred from pixels of the imaging area 41A and the OB area 42A through a vertical transfer path (not shown); a horizontal CCD 44B for horizontal transfer of charges transferred from pixels of the imaging area 41B and the OB area 42B through a vertical transfer path (not shown); and output amplifiers (not shown) for amplifying output video signals from the CCDs 44A and 44B.

The horizontal CCDs 44A and 44B output video signals from the left and right imaging areas 41A and 41B, respectively, per row of pixels.

The solid-state image sensing device 14 with the two signal output channels (horizontal CCDs 44A and 44B) also operates at horizontal-transfer clock frequency ½ that of known solid-state image sensing devices. The image sensing device 14 thus allows high-quality videos to be stored on storage media through an imaging apparatus similar to known apparatus.

The solid-state image sensing device 14 has a symmetrical structure as shown in FIG. 7.

Video signals taken from the imaging area 41A and the OB area 42A are output per row of pixels through the horizontal CCD 44A and the amplifier (not shown).

Moreover, video signals taken from the imaging area 41B and the OB area 42B are output per row of pixels through the horizontal CCD 44B and the amplifier (not shown).

The pixels in the left and right OB areas 42A and 42B are provided with photodiodes, color filters, on-chip lenses and vertical CCDs (transfer paths), having the same structure as the imaging areas 41A and 41B.

Different from the imaging areas 41A and 41B, the pixels in the OB areas 42A and 42B are provided with light shielding so that light from the outside can not reach the photodiodes. Thus, the OB areas 42A and 42B always output optically black-level (OB level) signals.

The OB-level signals from the OB areas 42A and 42B are also output per row of pixels through the horizontal CCDs 44A and 44B and also the amplifiers (not shown).

Disclosed next is another modification to the OB-clamp processor 5 shown in FIG. 3.

Figure 8:
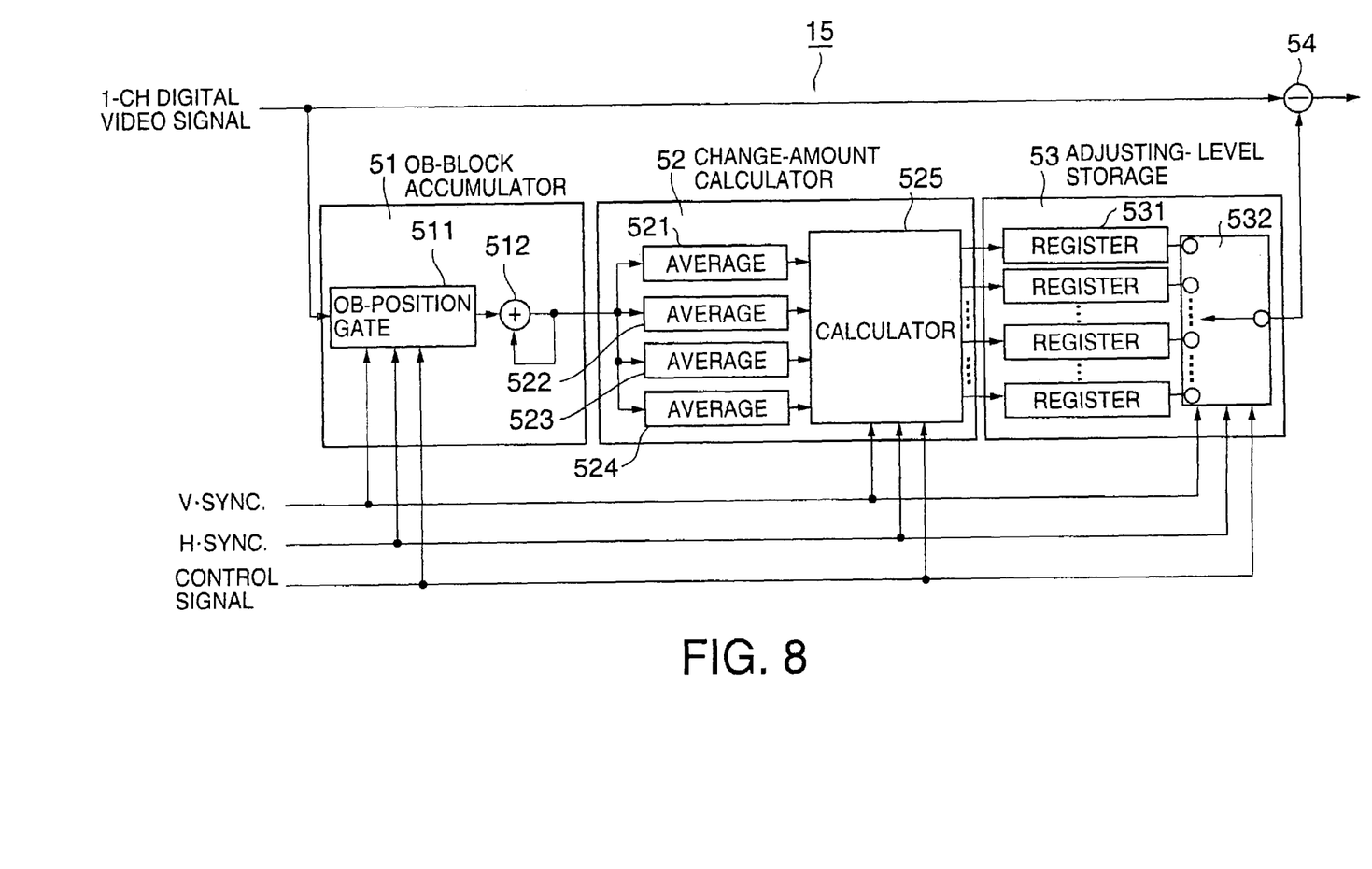
FIG. 8 is a block diagram of another modification to the OB-clamp processor shown in FIG. 3.

An OB-clamp processor 15 shown in FIG. 8 performs accumulation for each of four blocks of OB-level data output from the OB areas 42A and 42B.

The four blocks are blocks 43A1 to 43A4 in the OB area 42A and also blocks 43B1 to 43B4 in the OB area 42B, as shown in FIG. 7.

Figure 9:
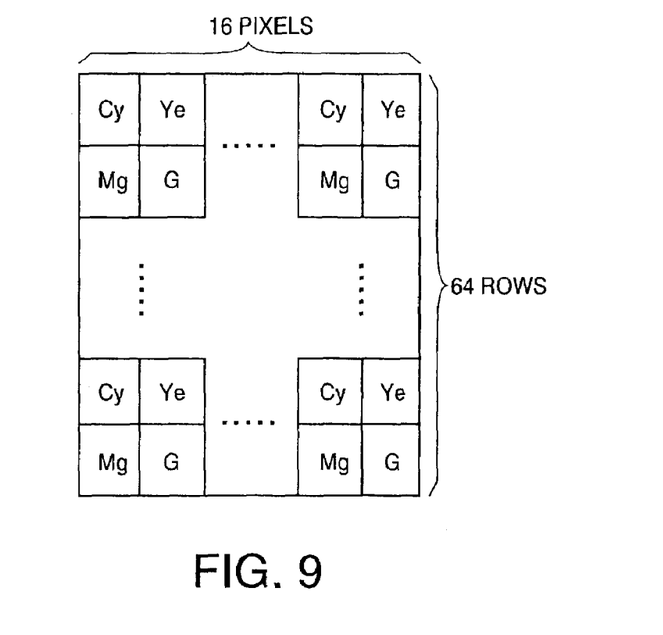
FIG. 9 is an illustration of each monitoring area shown in FIG. 7.

Each of the blocks 43A1 to 43A4 and the blocks 43B1 to 43B4 consists of, for example, 16 pixels in a horizontal direction and 64 pixels in a vertical direction, 1024 pixels in total, as shown in FIG. 9.

Eight pixels provided with cyan (Cy) color filters and other eight pixels provided with yellow (Ye) color filters are alternatively aligned in 16 pixels in total on each odd row. Moreover, eight pixels provided with magenta (Mg) color filters and other eight pixels provided with green (G) color filters are alternatively aligned in 16 pixels in total on each even row. In other words, each block covers 256 pixels for each color filter or 1024 pixels in total in FIG. 9.

The OB-clamp processor 15 performs calculation as follows:

An average OB-level data is calculated on each of the OB-area blocks 43A1 to 43A4 and also the OB-area blocks 43B1 to 43B4.

The average OB-level data on the block 43A1 is subtracted from a row signal for each of several rows of pixels in the imaging area 41A but close to the OB-area block 43A1. The same subtraction processing is applied to the average OB-level data on the blocks 43A2, 43A3 and 43A4.

The average OB-level data on the block 43B1 is subtracted from a row signal for each of several rows of pixels in the imaging area 41B but close to the OB-area block 43B1. The same subtraction processing is applied to the average OB-level data on the blocks 43B2, 43B3 and 43B4.

The locations of the blocks 43A1 to 43A4 in the OB area 42A and also the locations of the blocks 43B1 to 43B4 in the OB area 42B can be shifted to any positions in each OB area under control by the controller 11 (FIG. 1), for signal accumulation on areas which could suffer the least effects of noises or pixel degradation on the solid-state image sensing device 14.

The OB-clamp processor 15 in this modification will be disclosed in detail with reference to FIG. 8.

The OB-clamp processor 15 shown in FIG. 8 is employed for each of the imaging areas 41A and 41B (FIG. 7). In other words, two OB-clamp processors 15 are provided in parallel for the two imaging areas 41A and 41B.

In operation, 2-channel digital video signals are supplied to the OB-clamp processor 15 from the A/D converter shown in FIG. 1.

Among the 2-channel digital video signals, a 1-channel digital video signal (for example, derived from the imaging area 41A and the OB area 42A) is supplied to an OB-block accumulator 51 and a subtractor 54.

In the OB-block accumulator 51, the 1-channel digital video signal derived from the imaging area 41A and the OB area 42A is then supplied to an OB-position gate 511.

OB-level data on the four blocks 43A1 to 43A4 are output from the gate 511 based on positional data on the four blocks supplied by the controller 11 (FIG. 1) while vertical and horizontal synchronizing signals are being supplied.

The 4-block OB-level data output from the gate 511 are supplied to an adder 512 and added to the output thereof for accumulation.

The accumulated OB-level data on the four blocks 43A1 to 43A4 obtained by the OB-block accumulator 51 are supplied to a change-amount calculator 52.

In detail, the accumulated OB-level data on the four blocks 43A1 to 43A4 are supplied to averaging units 521, 522, 523 and 524, respectively, for averaging processing.

The four average accumulated OB-level data are supplied to a calculator 525 for obtaining an OB-adjusting level per row of pixels.

The calculator 525 performs calculation disclosed below for average accumulated OB-level data AV1 on the block 43A1 from rows La to Lb, AV2 on the block 43A2 from rows Lc to Ld, AV3 on the block 43A3 from rows Le to Lf, and AV4 on the block 43A4 from rows Lg to Lh.

The center positions in the blocks 43A1, 43A2, 43A3 and 43A4 in the vertical direction are given by $(La+Lb)/2$, $(Lc+Ld)/2$, $(Le+Lf)/2$ and $(Lg+Lh)/2$, respectively.

A distance $D(A12)$ between the center pixel in the block 43A1 and that in the block 43A2 is thus given by $$D(A12)=\{(Lc+Ld)/2\}-\{(La+Lb)/2\}.$$

An OB-level valiant X(A12) at the distance D(A12) is given by $$X(A12)=AV2-AV1.$$

Therefore, an OB-adjusting level OBA12(n) on each row of pixels between the blocks 43A1 and 43A2 is given by $$OBA12(n)=n \cdot X(A12)/D(A12)+AV1$$

where "n" indicates the n-th row of pixels between the center pixel in the block 43A1 and that in the block 43A2.

OB-adjusting levels on each row of pixels between the blocks 43A2 and 43A3, and also blocks 43A3 and 43A4 can be obtained in the same way.

Figure 10:
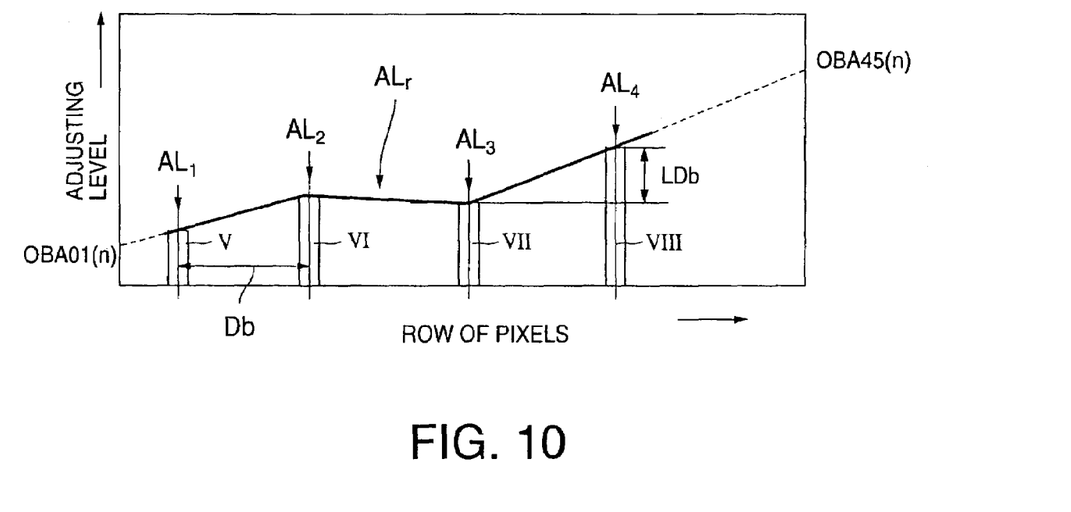
FIG. 10 is graph indicating OB-adjusting level per row of pixels calculated by the OB-clamp processor shown in FIG. 8.

An OB-adjusting level OBA01(n) between the first row and the center row in the block 43A1 and also an OB-adjusting level OBA45(n) between the center row in the block 43A4 and the last row, for example, the 480-th row for the solid-state image sensing device 14 (FIG. 7) having 480 rows of pixels in the vertical direction are given (FIG. 10) by $$OBA01(n)=AV1-(La-n) \cdot X(A12)/D(A12)$$

$$OBA45(n)=n \cdot X(A34)/D(A34)+AV4$$

where D(A34) is the distance between the center pixel in the block 43A3 and that in the block 43A4 and X(A34) is an OB-level valiant at the distance D(A34).

An OB-adjusting level on each row of pixels obtained by the change-amount calculator 52 (FIG. 8) as discussed above is shown in FIG. 10.

In FIG. 10, the signs $AL_1$, $AL_2$, $ALD_3$ and $AL_4$ indicate OB-adjusting levels obtained for the blocks 43A1, 43A2, 43A3 and 43A4, respectively.

Moreover, in FIG. 10, the sign $AL_r$ indicates an OB-adjusting level per row of pixels, $LD_b$ an OB-adjusting-level difference between the blocks in the vertical direction, such as, between the blocks 43A3 and 43A4, and $D_b$ a distance between the blocks in the vertical direction, such as the blocks 43A1 and 43A2$_3$.

The signs V, VI, VII and VIII, in FIG. 10, indicate the range of row of pixels in each block. For example, the left, the center and the right vertical lines in the range V indicate the top, the middle and the last row of pixels, respectively, in the block 43A1.

Each obtained OB-adjusting level is once stored in the corresponding register among 480 parallel registers 531 in an adjusting-level storage 53 in FIG. 8.

The stored OB-adjusting levels are supplied to a switch circuitry 532. Also supplied to the switch circuitry 532 are horizontal and vertical synchronizing signals of the input 1-channel video signal. The number of scanning lines of the input video signal is detected. The OB-adjusting levels corresponding to the detected scanning lines are selected by the switch circuitry 532 and supplied to a subtractor 54 for subtraction from the input 1-channel video signal in OB-clamping processing.

As disclosed above, OB-level change detection per row of pixels for varying OB-adjusting levels according to the present invention offers highly accurate OB-clamp function for the multi-pixel solid-state image sensing device 14 (FIG. 7). Therefore, the present invention achieves high reproducibility of constantly correct black level and achromatic color, thus suppressing shading due to change in black level and unnatural coloring under low illumination.

The present invention is not limited to the embodiment and modifications disclosed above. For example, the imaging apparatus shown in FIG. 1 equipped with the OB-clamp processor 5 (FIG. 3) extracts video signals on the left and right four monitoring areas as sampling signals, accumulates the sampling signals, calculates gain differences per row of pixels using the accumulated values for OB-level adjustments.

Not only that, it is also preferable that all signal levels are calculated per row of pixels in calculation of adjusting level per row of pixels, the calculated adjusting level being once stored in a buffer provided per row of pixels in the controller 11 (FIG. 1) in video-signal adjustments. Video signals at, for example, 16 pixels in left and right may be extracted and averaged as a level difference per row of pixels. Moreover, level accumulation for, for example, eight pixels and subtraction may be performed per color filter for further accurate gain-difference adjustments. This is achieved because the output of a pixel provided with two different types of color filters is generated per one clock.

Moreover, the imaging apparatus shown in FIG. 1 is equipped with the solid-state imaging device 2 or 14 having an imaging area divided into two areas in the horizontal direction. The imaging area may, however, be divided into three or more areas in the horizontal direction for signal-level adjustments on the borders between the divided areas with the same technique disclosed above. Or, several blocks may be provided in each of two OB areas at left and right edges of an imaging area for accumulation of OB signals from the blocks and calculation of OB-adjusting level per row of pixels in OB-clamp processing.

Furthermore, as shown in FIG. 9, eight pixels provided with cyan (Cy) color filters and other eight pixels provided with yellow (Ye) color filters are alternatively aligned in 16 pixels in total on each odd row. And also, eight pixels provided with magenta (Mg) color filters and other eight pixels provided with green (G) color filters are alternatively aligned in 16 pixels in total on each even row. In other words, each block covers 256 pixels for each color filter or 1024 pixels in total for OB-level data accumulation in each of the blocks 43A1 to 43A4 and 43B1 to 43B4.

This pixel arrangement allows for accumulation per color filter instead of accumulation of all 1024-pixel data from one block shown in FIG. 7. This is achieved with, in FIG. 8, two OB-block accumulators 51 that alternately accept a 1-channel digital video signal per pixel in accumulation per row of pixels and per color, and 16 registers (4 blocks×4 colors) in the adjusting-level storage 53 for storing the accumulated values of the change-amount calculator 52. In other words, change-amount calculators and adjusting-level storages are provided for four channels per color filter. The accumulation per color filter with such arrangements offers further accurate OB-clamp function with almost no errors due to unstable clocks or noises.

Moreover, the modifications shown in FIGS. 7 and 8 offer OB-clamp processing with accumulation of signals from the four blocks in each of the OB areas 42A and 42B and calculation of OB-adjusting level per row of pixels.

Not only that, it is also preferable that all OB levels are calculated per row of pixels in calculation of OB-adjusting level per row of pixels, the calculated OB-adjusting level being once stored in a buffer provided per row of pixels in the adjusting-level storage 53 (FIG. 8) in vides-signal adjustments. Video signals may be extracted from an OB area of, for example, 16 pixels per row and averaged as an adjusting level per row. Moreover, level accumulation for, for example, eight pixels and subtraction may be performed per color filter for further accurate OB-clamp function. This is achieved because the output of an OB pixel provided with two different types of color filters is generated per clock.

As disclosed above in detail, the present invention decreases stepped signal fluctuation occurring in the vicinity of the borders between several divided imaging areas due to gain differences occurring in mass production of output amplifiers, by adjustments to attain the least signal-level difference between video signals from the monitoring areas in the imaging areas.

Therefore, the present invention achieves suppression of stepped signal fluctuation in center section of image due to gain differences in output amplifiers or fluctuation in output of output buffers caused by temperature change, thus achieving high yields in production of solid-stage image sensing devices at low cost.

Moreover, the present invention achieves accurate OB-clamp processing with calculation of first and second OB-adjusting levels per row of pixels for first and second left and right OB areas, respectively, in an imaging area. The OB-clamp processing is applicable to multi-pixel solid-stage image sensing devices that often suffer a big OB-level difference due to difference in the number of charge transfer stages for OB areas (more transfer stages for pixels provided in the upper section than the lower section of each OB area). Therefore, the present invention achieves high reproducibility of constantly correct black level and achromatic color with no difference in black level with respect to a reference black level in up and down and also left and right in an imaging area, thus suppressing shading due to change in black level and unnatural coloring under low illumination.

Still furthermore, in the present invention, the locations of the blocks in the first and the second OB areas can be shifted to any positions in each OB area, particularly, to the positions that do not suffer effects of noises and pixel damages. Thus, the present invention achieves further accurate OB-clamp processing.

What is claimed is:

1. An imaging apparatus comprising:
   a solid-state image sensing device having an imaging area divided into at least two sub-imaging areas in a horizontal direction in the imaging area, a first optical-black area and a second optical-black area being provided at both edges of the imaging area in the horizontal direction;
   an extractor to extract first video signals from a plurality of monitoring areas provided in the sub-imaging areas in the vicinity of the border between the sub-imaging areas; and
   an optical-black clamp processor to apply optical-black clamp processing to second video signals output from the sub-imaging areas by subtracting a first optical-black signal indicating an optical black level in the first optical-black area from the second video signal output from one of the sub-imaging areas and subtracting a second optical-black signal indicating an optical black level in the second optical-black area from the second video signal output from the other of the sub-imaging areas, the optical-black clamp processor including:
   a detector to detect a level difference between the extracted first video signals;
   a calculator to calculate an adjusting value per row of pixels, that provides the smallest level difference per row of pixels in a vertical direction in the imaging area based on the detected level difference;
   a plurality of optical-black clampers each subtracting the first optical-black signal from the second video signal output from one of the sub-imaging areas and subtracting the second optical-black signal from the second video signal output from the other of the sub-imaging areas, thus outputting an optical-black-clamped video signal; and
   an adjuster to perform adjustments to video-signal levels by multiplying the optical-black-clamped video signal by the adjusting value.

2. An imaging apparatus comprising:
   a solid-state image sensing device having an imaging area divided into at least a first sub-imaging area and a second sub-imaging area in a horizontal direction in the imaging area, a first optical-black area and a second optical-black area being provided at both edges of the imaging area in the horizontal direction; and
   an optical-black clamp processor to apply optical-black clamp processing to first video signals output from the sub-imaging areas by subtracting a first optical-black signal indicating an optical black level in the first optical-black area from the first video signal output from one of the sub-imaging areas and subtracting a second optical-black signal indicating an optical black level in the second optical-black area from the first video signal output from the other of the sub-imaging areas, the optical-black clamp processor including:
   a first optical-black adjusting-level calculator to calculate a first optical-black adjusting level per row of pixels in a vertical direction in the first optical-black area;
   a second optical-black adjusting-level calculator to calculate a second optical-black adjusting level per row of pixels in the second optical-black area;
   a first adjuster to subtract the first optical-black adjusting level per row of pixels from a second video signal per row of pixels in the first sub-imaging area close to the first optical-black area; and
   a second adjuster to subtract the second optical-black adjusting level per row of pixels from a third video signal per row of pixels in the second sub-imaging area close to the second optical-black area.

3. The imaging apparatus according to claim 2, wherein:
   the first optical-black adjusting-level calculator calculates an average optical-black level in each of a plurality of first blocks each including a plurality of pixels in the vertical and the horizontal directions in the first optical-black area, and calculates first optical-black adjusting levels on the rows of pixels based on a plurality of average optical-black levels in the first blocks; and
   the second optical-black adjusting-level calculator calculates an average optical-black level in each of a plurality of second blocks each including a plurality of pixels in the vertical and the horizontal directions in the first optical-black area, and calculates second optical-black adjusting levels on the rows of pixels based on a plurality of average optical-black levels in the second blocks.

4. The imaging apparatus according to claim 3 further comprising a controller to shift locations of the first and the second blocks within the first and the second optical-black areas, respectively.

5. A method of optical-black clamping for an imaging apparatus having a solid-state image sensing device having an imaging area divided into at least two sub-imaging areas in a horizontal direction in the imaging area, a first optical-black area and a second optical-black area being provided at both edges of the imaging area in the horizontal direction, the method comprising the steps of:

extracting first video signals from a plurality of monitoring areas provided in the sub-imaging areas in the vicinity of the border between the sub-imaging areas; and applying optical-black clamp processing to second video signals output from the sub-imaging areas by subtracting a first optical-black signal indicating an optical black level in the first optical-black area from the second video signal output from one of the sub-imaging areas and subtracting a second optical-black signal indicating an optical black level in the second optical-black area from the second video signal output from the other of the sub-imaging areas, the applying step including:

detecting a level difference between the extracted first video signals;

calculating an adjusting value per row of pixels, that provides the smallest level difference per row of pixels in a vertical direction in the imaging area based on the detected level difference;

subtracting the first optical-black signal from the second video signal output from one of the sum-imaging areas and subtracting the second optical-black signal from the second video signal output from the other of the sum-imaging areas, thus outputting an optical-black-clamped video signal; and performing adjustments to video-signal levels by multiplying the optical-black-clamped video signal by the adjusting value.

6. A method of optical-black clamping for an imaging apparatus having a solid-state image sensing device having an imaging area divided into at least a first sub-imaging area and a second sub-imaging area in a horizontal direction in the imaging area, a first optical-black area and a second optical-black area being provided at both edges of the imaging area in the horizontal direction, the method comprising the steps of:

applying optical-black clamp processing to first video signals output from the sub-imaging areas by subtracting a first optical-black signal indicating an optical black level in the first optical-black area from the first video signal output from one of the sub-imaging areas and subtracting a second optical-black signal indicating an optical black level in the second optical-black area from the first video signal output from the other of the sub-imaging areas, the applying step including:

calculating a first optical-black adjusting level per row of pixels in a vertical direction in the first optical-black area;

calculating a second optical-black adjusting level per row of pixels in the second optical-black area;

subtracting the first optical-black adjusting level per row of pixels from a second video signal per row of pixels in the first sub-imaging area close to the first optical-black area; and subtracting the second optical-black adjusting level per row of pixels from a third video signal per row of pixels in the second sub-imaging area close to the second optical-black area.

7. The method of optical-black clamping according to claim 6, wherein:

the first optical-black adjusting-level calculating step includes the steps of calculating an average optical-black level in each of a plurality of first blocks each including a plurality of pixels in the vertical and the horizontal directions in the first optical-black area, and calculating first optical-black adjusting levels on the rows of pixels based on a plurality of average optical-black levels in the first blocks; and the second optical-black adjusting-level calculating step includes the steps of calculating an average optical-black level in each of a plurality of second blocks each including a plurality of pixels in the vertical and the horizontal directions in the first optical-black area, and calculating second optical-black adjusting levels on the rows of pixels based on a plurality of average optical-black levels in the second blocks.

8. The method of optical-black clamping according to claim 6 further comprising the step of shifting locations of the first and the second blocks within the first and the second optical-black areas, respectively.

* * * * *